(12) United States Patent
Brandt et al.

(10) Patent No.: US 12,486,356 B2
(45) Date of Patent: Dec. 2, 2025

(54) CRYSTALLINE POLYESTERPOLYOL

(71) Applicant: Henkel AG & Co. KGaA, Duesseldorf (DE)

(72) Inventors: Adrian Brandt, Essen (DE); Horst Beck, Neuss (DE); Alexander Kux, Monheim (DE); Bernhard M. Stadler, Rostock (DE); Johannes Gerardus De Vries, Rostock (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 811 days.

(21) Appl. No.: 17/449,314

(22) Filed: Sep. 29, 2021

(65) Prior Publication Data
US 2022/0017690 A1  Jan. 20, 2022

Related U.S. Application Data

(63) Continuation of application No. PCT/EP2020/057024, filed on Mar. 16, 2020.

(30) Foreign Application Priority Data

Apr. 3, 2019 (EP) .................................. 19166934

(51) Int. Cl.
*C08G 63/16* (2006.01)
*C09J 167/03* (2006.01)
*C09J 175/06* (2006.01)

(52) U.S. Cl.
CPC ............ *C08G 63/16* (2013.01); *C09J 167/03* (2013.01); *C09J 175/06* (2013.01); *C08G 2170/00* (2013.01); *C08G 2250/00* (2013.01)

(58) Field of Classification Search
CPC ........ C08G 63/16; C09J 167/03; C09J 175/06
See application file for complete search history.

(56) References Cited

U.S. PATENT DOCUMENTS

| 4,379,906 A | 4/1983 | Chattha |
| 4,459,401 A | 7/1984 | Sekmakas et al. |
| 5,162,457 A | 11/1992 | Haensel et al. |
| 5,849,859 A | 12/1998 | Acemoglu |
| 9,139,685 B2 | 9/2015 | Nefzger et al. |

(Continued)

FOREIGN PATENT DOCUMENTS

| CN | 109293904 A | 2/2019 |
| CN | 109370500 A | 2/2019 |

(Continued)

OTHER PUBLICATIONS

Li, J. Wuhan Univ. Technol.—Mat. Sci. Edit. 23, 100-104 (2008) (Year: 2008).*

(Continued)

*Primary Examiner* — Robert C Boyle
(74) *Attorney, Agent, or Firm* — Sun Hee Thomas

(57) ABSTRACT

The present invention refers to a polyesterpolyol which is obtained by reaction of at least one diol with at least one primary hydroxy group and at least one secondary hydroxy group with a saturated aliphatic dicarboxylic acid comprising a carbon chain of at least 12 carbon atoms. The invention further relates to an adhesive composition containing the polyesterpolyol, in particular a polyurethane adhesive composition.

18 Claims, 3 Drawing Sheets

(56) References Cited

U.S. PATENT DOCUMENTS

| | | | |
|---|---|---|---|
| 10,174,157 | B2 | 1/2019 | Bastioli et al. |
| 10,246,617 | B2 | 4/2019 | Cron et al. |
| 2009/0124956 | A1 | 5/2009 | Swetlin et al. |
| 2010/0105831 | A1 | 4/2010 | Brenner et al. |
| 2011/0014479 | A1* | 1/2011 | Song ................ C08G 18/4216 |
| | | | 156/305 |
| 2017/0020430 | A1 | 1/2017 | Drakoulis |
| 2017/0066950 | A1* | 3/2017 | Bae ...................... C08G 63/64 |
| 2021/0301069 | A1* | 9/2021 | Meng ................ C08G 18/4238 |

FOREIGN PATENT DOCUMENTS

| | | |
|---|---|---|
| EP | 0484761 A1 | 5/1992 |
| EP | 1149850 A1 | 10/2001 |
| EP | 2862886 A1 | 4/2015 |
| JP | H01174582 A | 7/1989 |
| JP | 2012531505 A | 12/2012 |
| JP | 2014201634 A | 10/2014 |
| JP | 2017002159 A | 1/2017 |
| JP | 2017082234 A | 5/2017 |
| WO | 2017044330 A1 | 3/2017 |

OTHER PUBLICATIONS

International Search Report for International PCT Patent Application No. PCT/EP2020/057024 dated Apr. 8, 2020.

\* cited by examiner

CRYSTALLINE POLYESTERPOLYOL

The present invention refers to a crystalline polyesterpolyol which is obtained by reaction of at least one diol with at least one primary hydroxy group and at least one secondary hydroxy group with a saturated aliphatic dicarboxylic acid comprising a carbon chain of at least 12 carbon atoms. The invention further relates to an adhesive composition containing the polyesterpolyol, in particular a polyurethane adhesive composition.

Polyester having terminal hydroxy groups, so-called polyesterpolyols, are popular building blocks in chemical synthesis, in particular in the production of adhesives and coatings. Polyesterpolyols are known to be stable and can be easily modified, making them the ideal reagent to be used as prepolymeric components in reactive adhesive systems. In particular, crystalline polyesters are often employed in adhesives due to their advantageous influence of the properties of the later product, in particular with regard to strength and elongation.

EP 1 149 850 refers to crystalline polyesterpolyols used in hot-melt adhesives that comprise a crystalline polyesterpolyol having a number average molecular weight of 1500 to 15000 and which is obtainable from a polybasic carboxylic acid component and an aliphatic hydrocarbon component comprising 1,10-decandiol and/or 1,12-dodecandiol, wherein the polyesterpolyol has a crystallinity of 50%.

US 2017/0204309 discloses a method for preparing polyester hot melt adhesives with high viscosity and locally sensitive viscosity-temperature properties, including the steps of i) subjecting terephthalic acid, isophthalic acid, dodecanedioic acid, adipic acid, butanediol, dipropylene glycol and hexane diol to an esterification reaction in the presence of tetrabutyl titanate serving as catalyst and ii) adding an antioxidant to a product resulting from step i) to conduct a polycondensation reaction under reduced pressure to obtain the high-viscosity hot melt adhesive which has a melting point of 130 to 135° C. and a partially sensitive viscosity-temperature property.

The crystalline polyesterpolyols described in the prior art suffer from the drawback that they have high melting points, making them only suitable for high-temperature applications such as hot melt adhesives. However, the application of such adhesives is limited due to the required high application temperatures which makes them unsuitable for the production of temperature-sensitive materials or in temperature-sensitive processes. In order to benefit from the advantageous properties of crystalline polyesterpolyols it would therefore be desirable to be able to employ crystalline polyesterpolyols in other systems as well. It is therefore the object of the present invention to provide polyesterpolyols which can be used in liquid systems at ambient temperature applications such as polyurethane adhesives, in particular two component polyurethane adhesives.

It was surprisingly found that the above object is solved by a polyesterpolyol which is obtained from a reaction mixture comprising a diol and a saturated aliphatic dicarboxylic acid.

A first object of the present invention is therefore a polyesterpolyol which is obtained from a reaction mixture comprising
  a) at least one diol with at least one primary hydroxy group and at least one secondary hydroxy group; and
  b) at least one saturated aliphatic dicarboxylic acid having a carbon chain of at least 12 carbon atoms.

The expression "carbon chain" used in connection to the dicarboxylic acid refers to the linear carbon chain separating the two carboxylic acid groups, the chain being terminated by a carboxylic acid group on each end with the carbon of the carboxylic acid group being the start and end point, respectively, for determining the number of carbon atoms in the carbon chain.

The molecular weight of the components comprised in the reaction mixture is determined according to standard procedure, for example by GPC or end group titration (OH value determination).

It was surprisingly found that the inventive polyesterpolyols are crystalline while at the same time having a low melting point, making them especially suitable for temperature-sensitive applications. In a preferred embodiment, the inventive polyesterpolyol has a crystalline morphology at ambient temperatures and below. Ambient temperature as used in the present invention refers to a temperature of 23 to 25° C. at a pressure of 1000 to 1020 hPa.

A polyesterpolyol exhibiting a crystalline morphology as used in the present invention refers to a polyesterpolyol wherein the majority of the polymer chains are at least partially aligned. The morphology of the polyesterpolyol may, for example, be determined by DSC, wherein the crystallinity is usually expressed by defined melting and crystallization peaks in the diagram. In contrast thereto, amorphous materials are characterized by the absence of defined peaks in the DSC diagram.

It was surprisingly found that the inventive polyesterpolyol can be employed in systems which are liquid at ambient temperatures, in particular room temperature, showing the advantageous properties usually associated with polyesterpolyols which are solid at ambient temperatures, such as improved strength and elongation of the later product.

Different processes for the production of crystalline polyesterpolyols are known to the person skilled in the art. However, said crystalline polyesterpolyols usually have a melting or softening point well above room temperature. It was surprisingly found that the melting point of the inventive polyesterpolyol may be adapted by employing suitable diols. Polyesterpolyols which are liquid at ambient temperature and show a high to degree of crystallization could especially be obtained from diols wherein at least one of the hydroxy groups was sterically hindered with dicarboxylic acids having a carbon chain of at least 12 carbon atoms.

In a preferred embodiment, the at least one diol is selected from the group consisting of 1,2-propane diol, 1,3-butane diol, 1,4-pentane diol, 1,5-hexane diol, 1,6-heptane diol and 1,7-octane diol.

It was surprisingly found that the melting point of the inventive polyesterpolyol may be adjusted according to need by selecting suitable dicarboxylic acids. However, care should be taken that the melting point of the polyesterpolyol is within a range suitable for applications at ambient temperatures. In a preferred embodiment, the at least one dicarboxylic acid therefore comprises a carbon chain of 12 to 24 carbon atoms, preferably 12 to 22 carbon atoms, in particular 12 to 18 carbon atoms. In an especially preferred embodiment, the at least one dicarboxylic acid is selected from the group consisting of 1,12-dodecanedioic acid, 1,14-tetradecanedioic acid, 1,16-hexadecanedioicacid and 1,18-octadecanedioic acid as well as anhydrides, esters and chlorides derived from said acids.

In an especially preferred embodiment, the diols and dicarboxylic acids from which the inventive polyesterpolyol is derived from are in turn derived from renewable sources. Generally, such compounds obtained from renewable sources are referred to as "bio-based" compounds, in contrast to the common petrol-based compounds.

The inventive polyesterpolyol is especially distinguished by its crystalline morphology while at the same time exhibiting a low melting point. In contrast to crystalline polyesterpolyols according to the state of the art which usually show high melting points above 80° C., the inventive polyesterpolyols were found to have melting points in low-temperature regions below 60° C., allowing for more flexible applications in a number of technical fields. In a preferred embodiment, the inventive polyesterpolyol has a melting point of −30 to 50° C., preferably −15 to 30° C., determined by DSC with a heating rate of 10 K/min.

Within the course of the present invention it was further surprisingly found that a polyesterpolyol derived from a reaction of a diol having a primary and a secondary hydroxy group with a dicarboxylic acid having a carbon chain of 12 carbons recrystallized during melting. This crystallization behavior can be observed by DSC as an exothermic crystallization peak which overlaps with the endothermic melting peak before reaching the liquid state. The inventive polyesterpolyols show favorable melting properties which is believed to be related to the recrystallization behavior. In a preferred embodiment, the inventive polyesterpolyol is therefore derived from a reaction of a saturated aliphatic dicarboxylic acid having a carbon chain of 12 carbons and a diol with at least one primary hydroxy group and at least one secondary hydroxy group. In this regard, it was surprisingly found that the inventive polyesterpolyol is especially suitable for the production of flexible films, in particular flexible films based on polyurethane adhesive compositions.

In order to adjust the properties of the inventive polyesterpolyol, other components may be comprised in the reaction mixture in addition to the at least one diol and the at least one dicarboxylic acid. It was found to be of particular advantage, if the reaction mixture comprised further diols in addition to the at least one diol. In a preferred embodiment, the reaction mixture therefore comprises additional diols, preferably selected from the group consisting of 1,3-propane diol, diethylene glycol, NPG, ethylene glycol, 1,4-butane diol and 1,6-hexane diol.

The reaction mixture from which the inventive polyesterpolyol is derived may also comprise additional acids, preferably in an amount of 0 to 20 mol-%, preferably 0 to 10 mol-%. The additional acids are preferably selected from the group consisting of succinic acid, adipic acid, sebacic acid, azelaic acid, isophthalic acid, orthophthalic acid, terephthalic acid, furan dicarboxylic acid, itaconic acid as well as anhydrides, chlorides and ester derived from said acids. It was surprisingly found that the presence of the additional acids leads to an improvement in the mechanical strength of the final adhesive film composition comprising the inventive polyesterpolyol.

In accordance with the later application, the reactivity of the inventive polyesterpolyol may also be adjusted according to need. In a further preferred embodiment, the inventive polyesterpolyol therefore has a hydroxyl value (OH value) of 5 to 150 mg KOH/g, 10 to 100 mg KOH/g. Hydroxyl value is a measure of the content of free hydroxyl groups in a chemical substance, usually expressed in units of the mass of potassium hydroxide (KOH) in milligrams equivalent to the hydroxyl content of one gram of the chemical substance. The analytical method used to determine hydroxyl value traditionally involves acetylation of the free hydroxyl groups of the substance with acetic anhydride in pyridine solvent. The hydroxyl value can be determined according to DIN 53240.

The hydroxyl value of the inventive polyesterpolyol can, for example, be adjusted by the ratio of diol to dicarboxylic acid in the reaction mixture. In a preferred embodiment, the molar ratio of the at least one diol to the at least one dicarboxylic acid in the reaction mixture is 1.5:1 to 1:1, preferably 1.2:1 to 1:1.

It was surprisingly found that despite the high degree of crystallinity of the inventive polyesterpolyol, a molecular weight of the inventive polyesterpolyol could be achieved within a range suitable for adhesive applications. In a preferred embodiment, the inventive polyesterpolyol has an average molecular weight $M_n$ of 1000 to 25000 g/mol, preferably 2000 to 10000 g/mol, determined by GPC. The molecular weight of the inventive polyesterpolyol can, in particular, be determined by GPC using THF as eluent.

The inventive polyesterpolyol is especially suitable for adhesive applications, in particular liquid systems. The presence of the inventive polyesterpolyol in the adhesives allows benefitting from the advantageous properties of crystalline polyesterpolyols without the need of having to melt the adhesive. Rather, adhesives are obtainable which can be used and applied at ambient temperatures. A further object of the present invention is therefore an adhesive comprising the polyesterpolyol according to the invention.

Due to the low melting point, the inventive polyesterpolyol exhibits a very positive energy efficiency and may be applied in temperature-sensitive applications. However, in a preferred embodiment, the inventive adhesive is preferably liquid at a temperature of 25° C. thereby eliminating the need for heating and melting the adhesive before application. Also, difficulties due to recrystallization of the adhesive after application and solidification during storage are avoided.

The inventive polyesterpolyol can be applied in a number of adhesive systems. Preferably, the inventive adhesive is a polyurethane adhesive, in particular two-component polyurethane adhesive (2K system) and one-component polyurethane adhesive (1K system).

A further object of the present invention is the use of the polyesterpolyol according to the invention in adhesives and coatings. In a preferred embodiment, the inventive polyesterpolyol is used in polyurethane adhesives.

The invention will be explained in more detail with reference to the following examples which by no means are to be understood as limiting the scope or spirit of the invention.

EXAMPLES

The inventive polyesterpolyols were obtained by mixing the at least one diol and the at least one dicarboxylic acid and heating the reaction mixture to a temperature of 140 to 240° C. After completion of the reaction, the mixture was allowed to cool to room temperature in an argon atmosphere and the obtained polyesterpolyol was then analyzed by DSC using a heating rate of 10 K/min.

Figure 1:
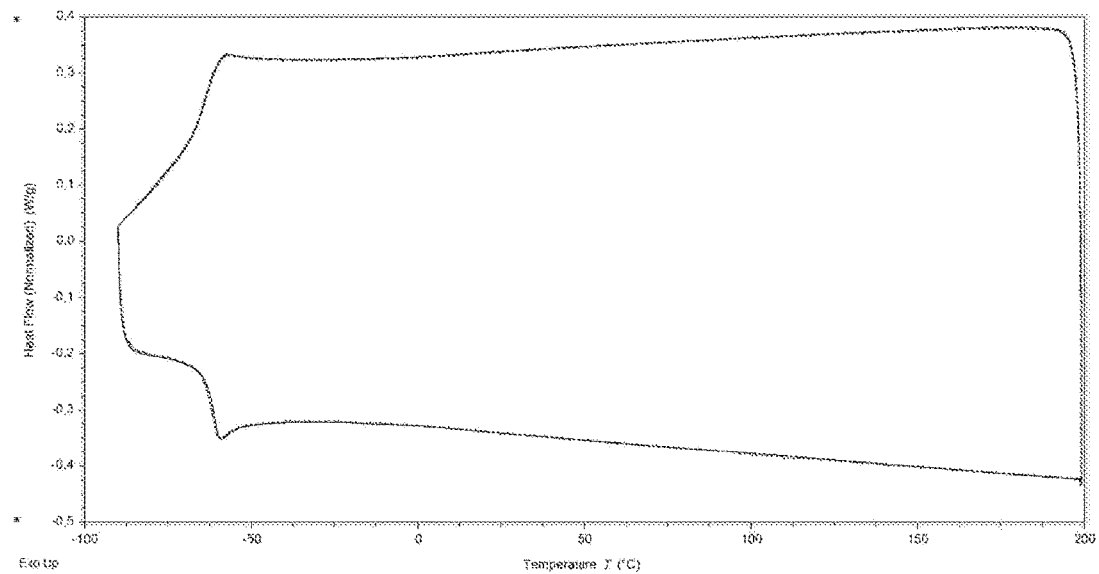
FIG. 1 shows the DSC diagrams of a comparative polyesterpolyol obtained from a reaction mixture comprising 1,4-pentane diol and a dicarboxylic acid with a C10 carbon chain. The amorphous character of the polyesterpolyol can be clearly identified by the provided DSC.
Figure 2:
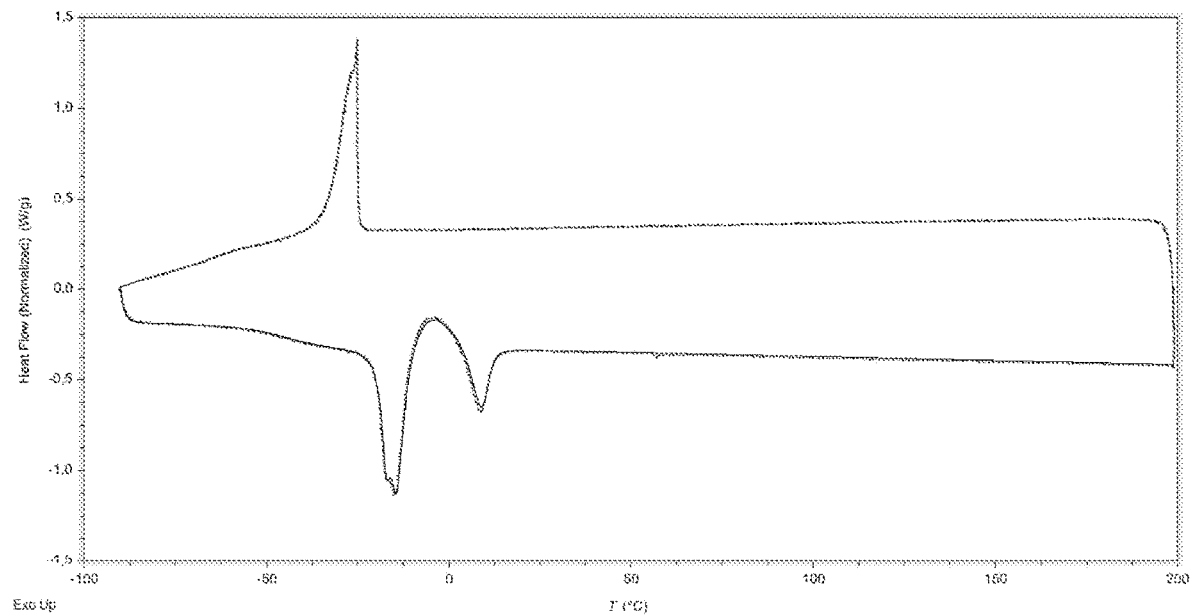
FIGS. 2 and 3 show DSC diagrams of inventive polyesterpolyols which were obtained by reaction of 1,4-pentane diol with a dicarboxylic acid having a C12 and C14 carbon chain, respectively. The unexpected crystalline morphology of each polyesterpolyol can be clearly depicted by the distinct melting peaks in the DSC diagrams.
Figure 3:
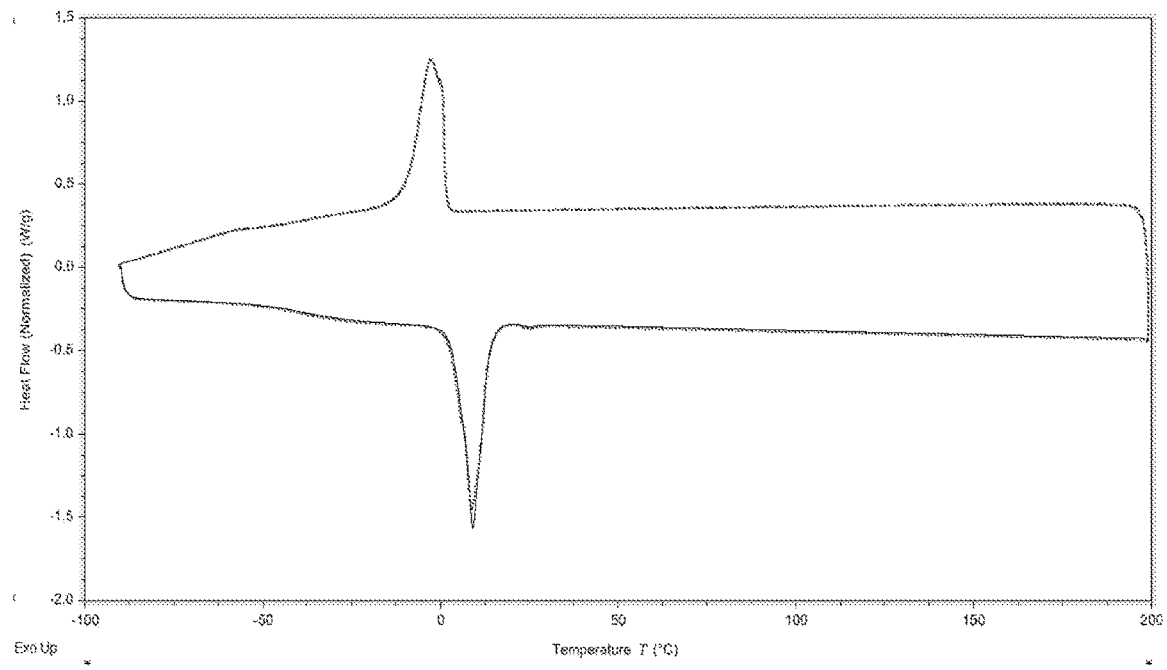
Figure 4:
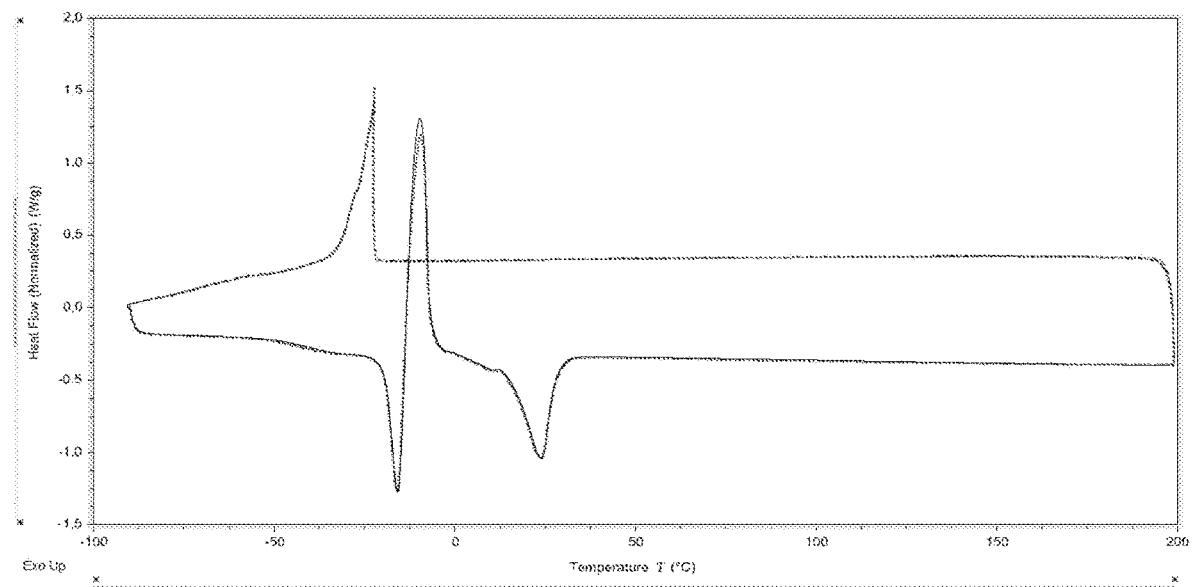
FIG. 4 shows the DSC diagram of an inventive polyesterpolyol derived by reacting 1,3-butane diol with a dicarboxylic acid having a C12 carbon chain. The unexpected polymorphous properties of the polyesterpolyol is clearly expressed in the distinct crystallization peak during melting.
Figure 5:
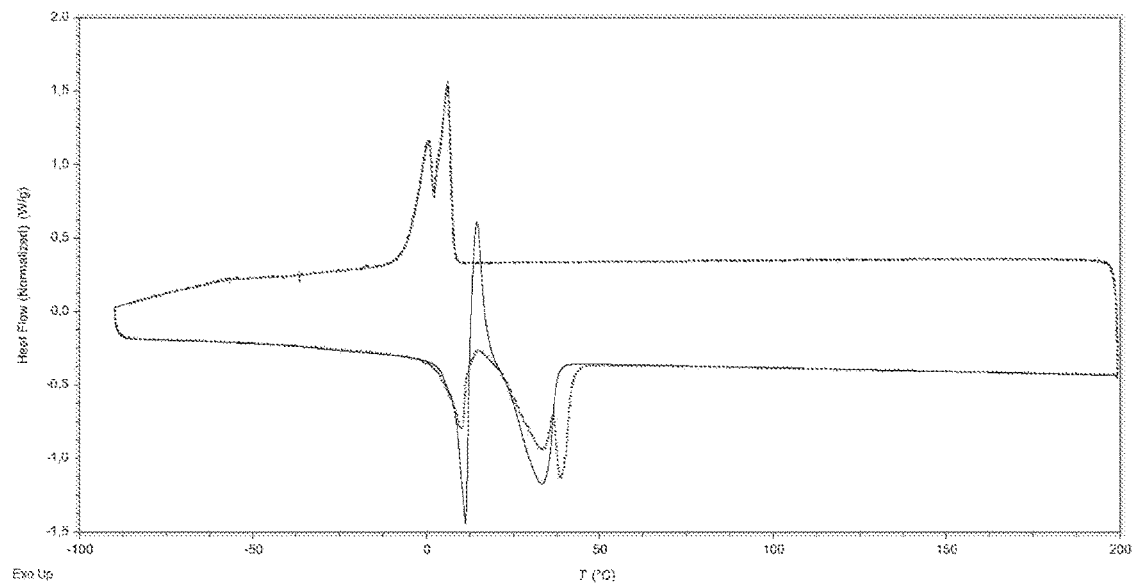
FIG. 5 shows the DSC diagram of an inventive polyesterpolyol derived by reacting 1,2-propylene glycol with a dicarboxylic acid having a C12 carbon chain. The polymorphous properties of the polyesterpolyol is clearly expressed in the distinct crystallization peak during melting.
Figure 6:
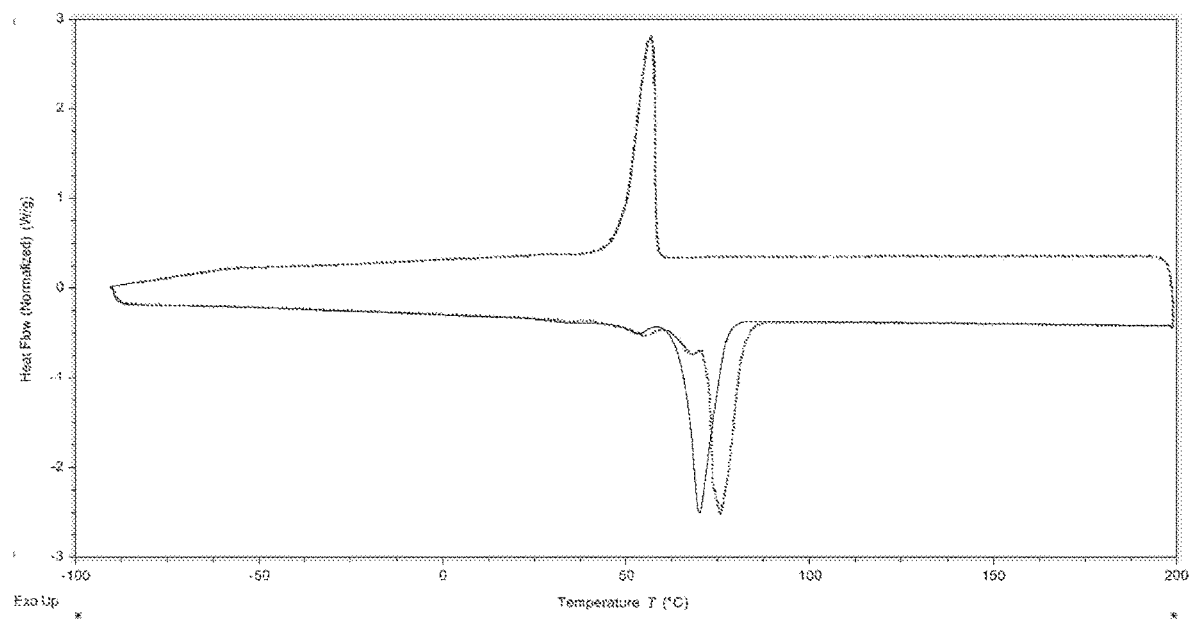
FIG. 6 shows the DSC diagram of a comparative polyesterpolyol derived from the reaction of 1,4-butane diol with a dicarboxylic acid having a C12 carbon chain. As can be clearly seen from the provided diagram, the polyesterpolyol does not exhibit the polymorphous properties observed in connection with the similar inventive polyesterpolyols obtained from the reaction of the same dicarboxylic acid with 1,3-butane diol, 1,4-pentane diol and 1,2-propylene glycol, respectively.

The invention claimed is:

1. A crystalline polyesterpolyol that is the reaction product of a reaction mixture comprising:
    a) a diol selected from the group consisting of 1,2-propane diol, 1,3-butane diol, and 1,4-pentane diol;
    b) a saturated aliphatic dicarboxylic acid having a carbon chain of 12 carbon atoms or 14 carbon atoms, wherein the carbon chain is terminated at each end with a carboxylic acid group; and
    c) at least one other diol and/or at least one additional dicarboxylic acid,
    wherein the crystalline polyesterpolyol is liquid at ambient temperature and exhibits defined polymorphic crystallization peaks below 50° C., determined by DSC with a heating rate of 10K/min.

2. The crystalline polyesterpolyol of claim 1, wherein the carbon chain has 12 carbon atoms.

3. The crystalline polyesterpolyol of claim 1, wherein the saturated aliphatic dicarboxylic acid is selected from the group consisting of 1,12-dodecanedioic acid and 1,14-tetradecanedioic acid.

4. The crystalline polyesterpolyol of claim 1, wherein the at least one other diol is selected from the group consisting of 1,3-propane diol, diethylene glycol, NPG, ethylene glycol, 1,4-butane diol, 1,6-hexane diol, and any mixture thereof.

5. The crystalline polyesterpolyol of claim 1, wherein the crystalline polyesterpolyol has a hydroxyl value (OH value) of from 5 to 150 mg KOH/g, determined according to DIN 53240.

6. The crystalline polyesterpolyol of claim 1, wherein the at least one additional dicarboxylic acid is selected from the group consisting of succinic acid, adipic acid, sebacic acid, azelaic acid, isophthalic acid, orthophthalic acid, terephthalic acid, furan dicarboxylic acid, itaconic acid, and anhydrides, chlorides and esters thereof.

7. The crystalline polyesterpolyol of claim 1, wherein the diol and the saturated aliphatic dicarboxylic acid are present in the reaction mixture in a molar ratio of from 1.5:1 to 1:1.

8. An adhesive composition comprising the crystalline polyesterpolyol of claim 1.

9. The adhesive composition of claim 8, wherein the adhesive composition is liquid at a temperature of 25° C.

10. The adhesive composition of claim 8, wherein the adhesive composition is a curable polyurethane adhesive.

11. The adhesive composition of claim 8, wherein the adhesive composition is a two-component, curable polyurethane adhesive that is liquid at ambient temperature.

12. The crystalline polyesterpolyol of claim 1, wherein the diol is selected from the group consisting of 1,2-propane diol and 1,4-pentane diol.

13. The crystalline polyesterpolyol of claim 5, wherein the crystalline polyesterpolyol has a hydroxyl value (OH value) of from 10 to 100 mg KOH/g, determined according to DIN 53240.

14. The crystalline polyesterpolyol of claim 7, wherein the diol and the saturated aliphatic dicarboxylic acid are present in the reaction mixture in a molar ratio of from 1.2:1 to 1:1.

15. A crystalline polyesterpolyol that is the reaction product of a reaction mixture comprising:
    a) a diol selected from the group consisting of 1,2-propane diol, 1,3-butane diol, and 1,4-pentane diol; and
    b) a saturated aliphatic dicarboxylic acid selected from the group consisting of 1,16-hexaadecanedioic acid and 1,18-octadecanedioic acid,
    wherein the crystalline polyesterpolyol is liquid at ambient temperature and exhibits defined polymorphic crystallization peaks below 50° C., determined by DSC with a heating rate of 10K/min.

16. The crystalline polyesterpolyol of claim 15, wherein the reaction mixture further comprises at least one additional compound selected from the group consisting of succinic acid, adipic acid, sebacic acid, azelaic acid, isophthalic acid, orthophthalic acid, terephthalic acid, furan dicarboxylic acid, itaconic acid, and anhydrides, chlorides and esters thereof.

17. A crystalline polyesterpolyol that is the reaction product of a reaction mixture comprising:
    a) a diol selected from the group consisting of 1,3-butane diol and 1,4-pentane diol; and
    b) a saturated aliphatic dicarboxylic acid having a carbon chain of 12 carbon atoms or 14 carbon atoms, wherein the carbon chain is terminated at each end with a carboxylic acid group,
    wherein the crystalline polyesterpolyol is liquid at ambient temperature and exhibits defined polymorphic crystallization peaks below 50° C., determined by DSC with a heating rate of 10K/min.

18. The crystalline polyesterpolyol of claim 17, wherein the reaction mixture further comprises at least one additional compound selected from the group consisting of succinic acid, adipic acid, sebacic acid, azelaic acid, isophthalic acid, orthophthalic acid, terephthalic acid, furan dicarboxylic acid, itaconic acid, and anhydrides, chlorides and esters thereof.

* * * * *